2,981,744

FATTY ACID PROCESSING

Norman Ernest Ward, Monkseaton, Whitley Bay, Northumberland, England, assignor to The Procter & Gamble Company, Cincinnati, Ohio, a corporation of Ohio No Drawing. Filed July 21, 1959, Ser. No. 828,440
Claims priority, application Great Britain July 23, 1958
7 Claims. (Cl. 260—419)

This invention relates to the treatment of fatty acids produced by the hydrolysis of fats or fatty oils, and to the manufacture of products, especially soap, from the treated fatty acids.

When fatty acids are obtained by fat or fatty oil hydrolysis and these fatty acids are distilled, certain odorous substances distil with the distillate and give it an objectionable odour. When these distilled fatty acids are converted into soap by neutralization, for example, with sodium hydroxide, the resulting soap also possesses an objectionable odour.

It is an object of the present invention to provide a means of treating distilled fatty acids from fat or fatty oil hydrolysis, so that fatty acid products, especially soap, may be obtained with improved odour, as compared with the corresponding products prepared from similar fatty acids not so treated.

This object is achieved according to the present invention by converting the fatty acids with acetic anhydride into the corresponding fatty anhydrides which have a lower volatility than the objectionable odorous substances and thereafter distilling off the acetic acid which is formed, any excess acetic anhydride and the odorous substances.

In a preferred process according to the present invention odorous substances are removed from distilled fatty acids produced from the hydrolysis of fats or fatty oils by treating the fatty acids with acetic anhydride to convert them substantially to fatty anhydrides followed by a two-stage distillation process to remove the acetic acid which is formed and any excess acetic anhydride in the first stage, suitably performed at atmospheric pressure, and then increasing the temperature and/or reducing the pressure to distil off the odorous substances in a second stage.

The distillation may be performed in any of the customary ways, including flash distillation, but whatever method is used, care must be taken to avoid charring or decomposition of the fatty anhydrides.

The resultant fatty anhydrides have a reduced odour as compared with the original distilled fatty acids, and may then be converted into fatty acid derivatives of reduced odour. For example, the fatty anhydrides may be reacted with sodium hydroxide solution yielding a sodium soap with reduced and more acceptable odour, as compared with sodium soap made from untreated distilled fatty acids. Other bases may be used to form such alkali metal, ammonium or amine soap as may be required.

Other fatty acid derivatives than soap may be prepared from the fatty anhydrides freed from substances of objectionable odour.

The following example is given for the purpose of illustrating the invention:

*Example*

A sample of low grade tallow was split and the fatty acids distilled.

500 grams of the distilled fatty acids and 196.5 grams of acetic anhydride were placed in a distillation flask fitted with a mechanical agitator, thermometers to measure liquid and vapour temperatures and a water cooled condenser. Provision was made for introducing a slow stream of nitrogen just above the liquid surface to protect the liquid from oxidation.

The liquid was heated under atmospheric pressure, over a period of 20 minutes to a temperature of 284° F. at which temperature acetic acid distills off, the vapour temperature being 244.5° F. When removal of acetic acid was completed, the liquid temperature was increased to 380° F., the vapour temperature being 284° F., due to distillation of acetic anhydride.

Nitrogen flow was then stopped and the pressure reduced to 3 mm. Hg. The liquid temperature was raised to 430° F., and maintained at this temperature for 20 minutes. The liquid was agitated throughout the entire operation.

After cooling, the fatty anhydride reaction product was converted to soap by reaction with 20% aqueous sodium hydroxide, giving a soap of good odour, superior to that of soap obtained from the original fatty acids not treated by the process of this invention.

It will be appreciated that the optimum amount of acetic anhydride used will vary according to the mean molecular weight of the fatty acids being treated.

I claim:

1. A process for removing odorous substances from distilled fatty acids produced from the hydrolysis of fats or fatty oils which comprises converting the fatty acids with acetic anhydride into the corresponding fatty anhydrides which have a lower volatility than the odorous substances, and thereafter distilling off the acetic acid which is formed, any excess acetic anhydride, and the odorous substances.

2. A process for removing odorous substances from distilled fatty acids produced from the hydrolysis of fats or fatty oils which comprises converting the fatty acids with acetic anhydride into the corresponding fatty anhydrides which have a lower volatility than the odorous substances, distilling off the acetic acid which is formed and any excess acetic anhydride in a first distillation stage, and then increasing the temperature to distil off the odorous substances in a second distillation stage.

3. A process for removing odorous substances from distilled fatty acids produced from the hydrolysis of fats or fatty oils which comprises converting the fatty acids with acetic anhydride into the corresponding fatty anhydrides which have a lower volatility than the odorous substances, distilling off the acetic acid which is formed and any excess acetic anhydride in a first distillation stage, and then reducing the pressure to distil off the odorous substance in a second distillation stage.

4. A process for removing odorous substances from distilled fatty acids produced from the hydrolysis of fats or fatty oils which comprises converting the fatty acids with acetic anhydride into the corresponding fatty anhydrides which have a lower volatility than the odorous substances, distilling off the acetic acid and any excess acetic anhydride in a first distillation stage and then increasing the temperature and reducing the pressure to distil off the odorous substances in a second distillation stage.

5. A process for removing odorous substances from distilled fatty acids produced from the hydrolysis of fats or fatty oils which comprises converting the fatty acids with acetic anhydride into the corresponding fatty anhydrides, heating the reaction mixture at atmospheric pressure to distil off the acetic acid which is formed and any excess acetic anhydride in a first distillation stage, and reducing the pressure to distil off the odorous substances in a second distillation stage.

6. A process for producing soaps having reduced objectionable odour which comprises treating distilled fatty acids containing odorous substances and produced from the hydrolysis of fats or fatty oils with acetic anhydride to convert them into the corresponding fatty anhydrides which have a lower volatility than the odorous substances, distilling off the acetic acid which is formed, any excess acetic anhydride and the odorous substances, and finally saponifying the fatty anhydrides so obtained to form the soaps.

7. A process for producing soaps having reduced objectionable odour which comprises treating distilled fatty acids containing odorous substances and produced from the hydrolysis of fats or fatty oils with acetic anhydride to convert them into the corresponding fatty anhydrides which have a lower volatility than the odorous substances, distilling off at atmospheric pressure the acetic acid so formed and any excess acetic anhydride in a first distillation stage, distilling off the odorous substances in a second distillation stage at sub-atmospheric pressure, and finally saponifying the fatty anhydrides so obtained to form the soap.

References Cited in the file of this patent
UNITED STATES PATENTS 2,315,664    Semon _____ Apr. 6, 1943
2,877,247    Nichols et al. _____ Mar. 10, 1959